US011534899B2

(12) United States Patent
Tharpe

(10) Patent No.: US 11,534,899 B2
(45) Date of Patent: Dec. 27, 2022

(54) PULLER SPACER

(71) Applicants: H and J Trucking Company, Inc., Charleston, SC (US); H. Keith Johnson, Charleston, SC (US)

(72) Inventor: David Kent Tharpe, Awendaw, SC (US)

(73) Assignee: H. Keith Johnson, Charleston, SC (US)

( * ) Notice: Subject to any disclaimer, the term of this patent is extended or adjusted under 35 U.S.C. 154(b) by 470 days.

(21) Appl. No.: 16/690,173

(22) Filed: Nov. 21, 2019

(65) Prior Publication Data
US 2020/0086465 A1    Mar. 19, 2020

Related U.S. Application Data

(62) Division of application No. 15/697,527, filed on Sep. 7, 2017, now Pat. No. 10,486,292.

(51) Int. Cl.
*B23P 19/00* (2006.01)
*B25B 27/00* (2006.01)
*B25B 27/02* (2006.01)
*B25B 27/06* (2006.01)
*B23P 19/04* (2006.01)

(52) U.S. Cl.
CPC .......... *B25B 27/0035* (2013.01); *B23P 19/04* (2013.01); *B25B 27/023* (2013.01); *B25B 27/062* (2013.01)

(58) Field of Classification Search
CPC ..... B25B 27/00; B25B 27/023; B25B 27/062; B23P 19/00; B23P 19/04
See application file for complete search history.

(56) References Cited

U.S. PATENT DOCUMENTS

| 4,074,410 | A | 2/1978 | Jarm |
| 4,649,615 | A | 3/1987 | Hundley |
| 4,868,965 | A | 9/1989 | Drymon |
| 4,989,312 | A | 2/1991 | Maddalena |
| 5,781,978 | A | 7/1998 | Fleming |
| 6,314,632 | B1 | 11/2001 | Athan |
| 6,343,411 | B1 | 2/2002 | Sigman |
| 6,715,384 | B1 * | 4/2004 | Kozak ..................... B25B 13/06 |
| | | | 81/176.15 |
| 6,990,713 | B2 | 1/2006 | Tally et al. |
| 6,993,816 | B2 * | 2/2006 | Greenhill ............... B25B 27/20 |
| | | | 29/229 |
| 7,770,277 | B2 | 8/2010 | Wridt |
| 8,256,081 | B2 * | 9/2012 | Fridman ............... B25B 27/062 |
| | | | 29/244 |

(Continued)

*Primary Examiner* — Lee D Wilson
(74) *Attorney, Agent, or Firm* — B. Craig Killough

(57) ABSTRACT

A puller spacer has a cylindrical and elongated body. The puller spacer has a slot formed in a side of the body. The slot extends from a center bore of the puller spacer to an exterior of the puller spacer. Wires that extend out of a steering column are routed through a bottom of the puller spacer and into a center bore of the puller spacer, with an end of each of the wires extending out of the slot formed in a side of the puller spacer. The puller spacer is positioned between a distal end of a center threaded member of a steering wheel puller and the top of the steering column. The steering wheel puller engages the steering wheel and the center threaded member of the steering wheel puller is advanced to pull the steering wheel away from the steering column.

12 Claims, 7 Drawing Sheets

(56) References Cited

U.S. PATENT DOCUMENTS

| | | |
|---|---|---|
| 8,739,377 B2 | 6/2014 | Shen |
| 9,114,511 B1* | 8/2015 | Wang ............... B25B 13/465 |
| 10,486,292 B2* | 11/2019 | Tharpe ............. B25B 27/062 |
| 11,285,583 B2* | 3/2022 | Stuart ............. B25B 23/0035 |
| 2009/0044674 A1* | 2/2009 | Neitzell ............... B27B 5/12 |
| | | 83/495 |
| 2016/0151867 A1 | 6/2016 | Chen |
| 2017/0120347 A1* | 5/2017 | Lourenco ........... B27G 15/00 |
| 2019/0070715 A1 | 3/2019 | Tharpe |

* cited by examiner

PULLER SPACER

This application is a divisional of Utility patent application Ser. No. 15/697,527, filed Sep. 7, 2017.

BACKGROUND OF THE INVENTION

It is sometimes necessary to remove steering wheels from vehicles such as large trucks to make repairs or for replacement of the steering wheel. The repair or replacement may be to the steering wheel itself, or to some apparatus associated with the steering column.

Steering wheels are mounted to steering columns by frictional fit. Pulling devices are used to pull the steering wheel away from the steering column. These devices commonly use a threaded member that is rotated to apply a force to the steering column and pull the steering wheel away from the steering column.

Steering wheels for vehicles may have switches mounted in them for actuation of the vehicle's horn. Conductor wires are associated with the horn that extends through the steering column and into the horn switch.

The threaded member that engages the steering column when pulling the steering wheel contacts the conductor wires for the horn switch. Frequently, pulling devices damage the horn wires. The wires may get tangled in the pulling device or the pulling device may cut the wires as it applies pressure to the steering column.

There is a need for a device that eliminates damage to horn wires as a steering wheel is removed from a steering column.

SUMMARY OF THE INVENTION

A puller spacer has a cylindrical and elongated body. The puller spacer has a slot formed in a side of the body. The slot extends from a center bore of the puller spacer to an exterior of the puller spacer.

A steering wheel is removed from a vehicle by positioning wires that extend out of a steering column though a bottom of the puller spacer and into a center bore of the puller spacer, with an end of each of the wires extending out of the slot formed in a side of the puller spacer. The puller spacer is positioned between a distal end of a center threaded member of a steering wheel puller and the top of the steering column. The steering wheel puller engages the steering wheel. The center threaded member of the steering wheel puller is advanced against the puller spacer and the steering column to pull the steering wheel away from the steering column.

BRIEF DRAWING DESCRIPTION

DESCRIPTION OF PREFERRED EMBODIMENTS

Figure 6:
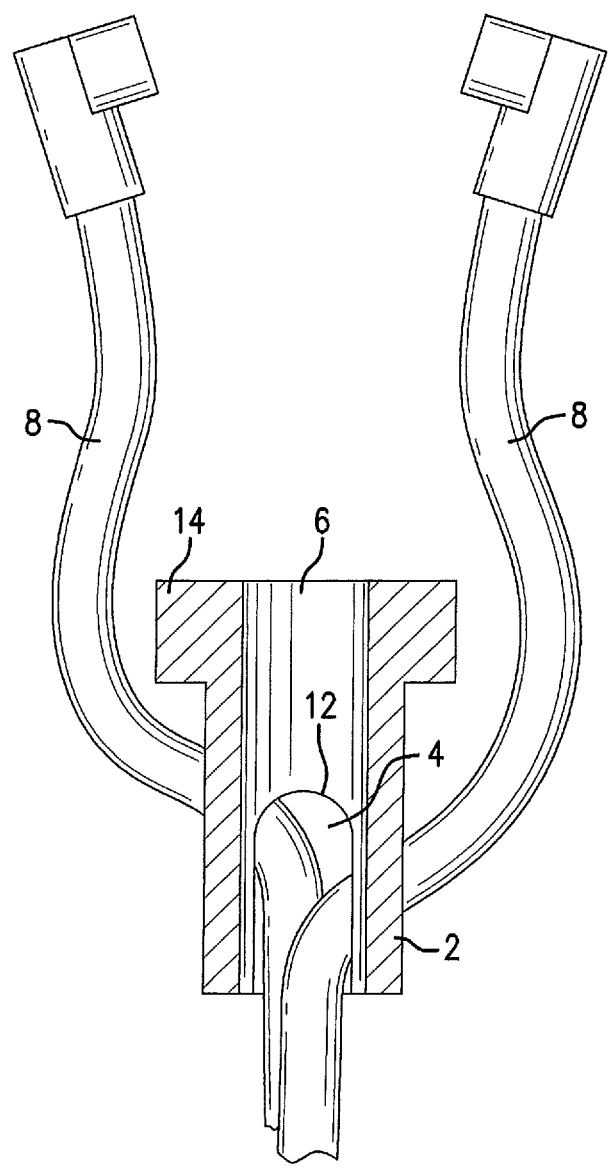
FIG. 6 is a sectioned view the puller spacer showing conductive wires extending into the center bore of the puller spacer and out of the slot in the side of the puller spacer.

As shown in FIG. 6, the puller spacer in a preferred embodiment has an elongated and cylindrical body 2. The cylindrical body has a slot 4 formed in a side thereof. The slot is preferred to extend approximately half of the length of the body, and extends through the bottom of the cylindrical body to form an opening at the bottom of the cylindrical body. The slot is preferred to have an arcuate top portion 12 having no sharp edges or corners as the top portion joins generally parallel sides, thereby reducing the likelihood of damage to conductive wires that extend through the slot. The slot is constructed to allow at least two insulated wires of 10 gauge each to pass through the slot. A center bore 6 is formed in the body of the puller spacer, which may extend from the bottom of the body to the top of the cylindrical body, opening at the top of the body and the bottom of the cylindrical body. In another embodiment, the body is not cylindrical, but the body has a slot and a center bore that opens at a top and a bottom of the body.

In one embodiment, shoulders 14 of the puller spacer are enlarged so as to extend over the body, thereby increasing a surface area for engagement with the threaded member assembly of the steering wheel puller. The shoulders extend over the entire circumference of the elongated and lower part of the body 2. The shoulders preferably have a larger diameter than the diameter of the elongated and lower part of the body.

Figure 1:
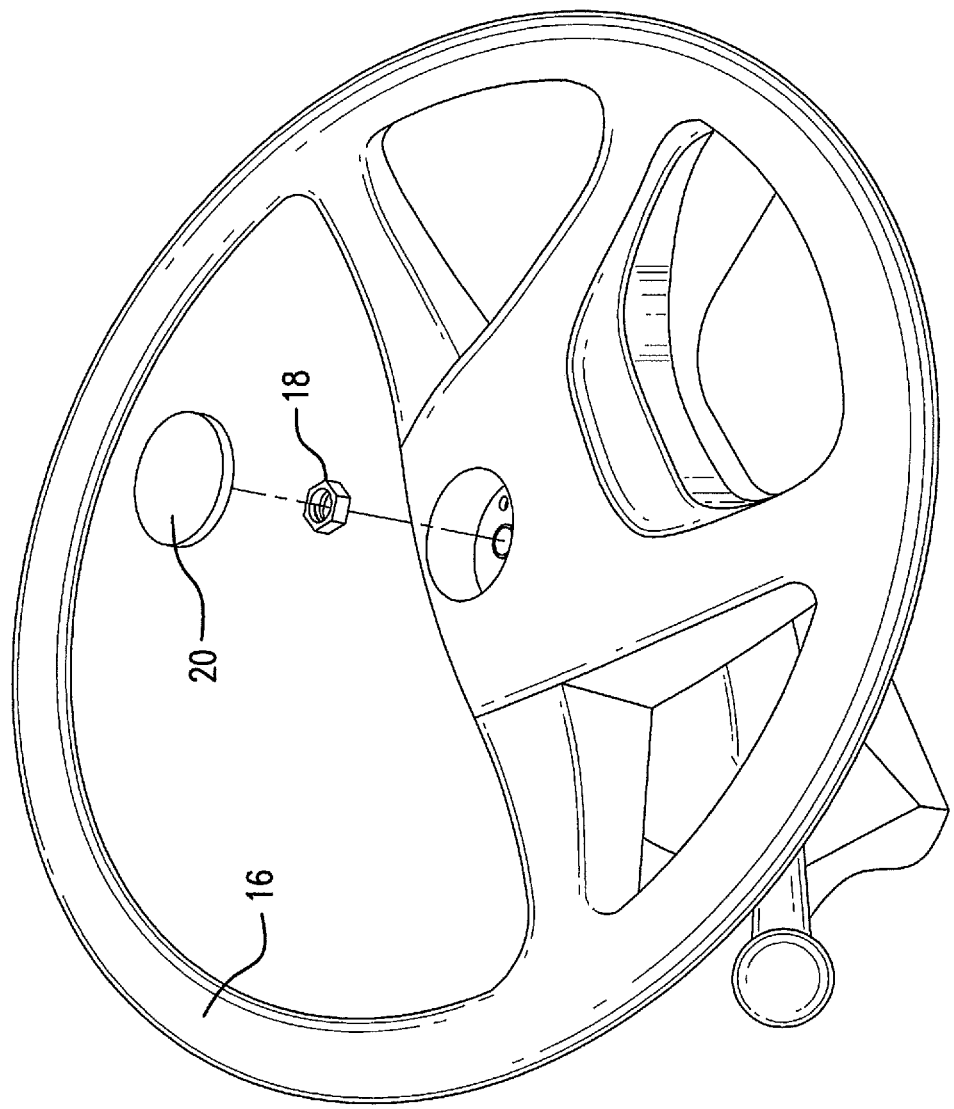
FIG. 1 is a perspective view of a steering wheel with a fastener exploded away from the steering column.

Commonly, the steering wheel 16 is mounted to the steering column with a fastener, such as a nut 18. FIG. 1. The fastener may be covered, such as by a button 20 that forms part of a horn switch. To remove the steering wheel, the fastener must be disengaged and removed from the steering wheel and steering column.

Figure 2:
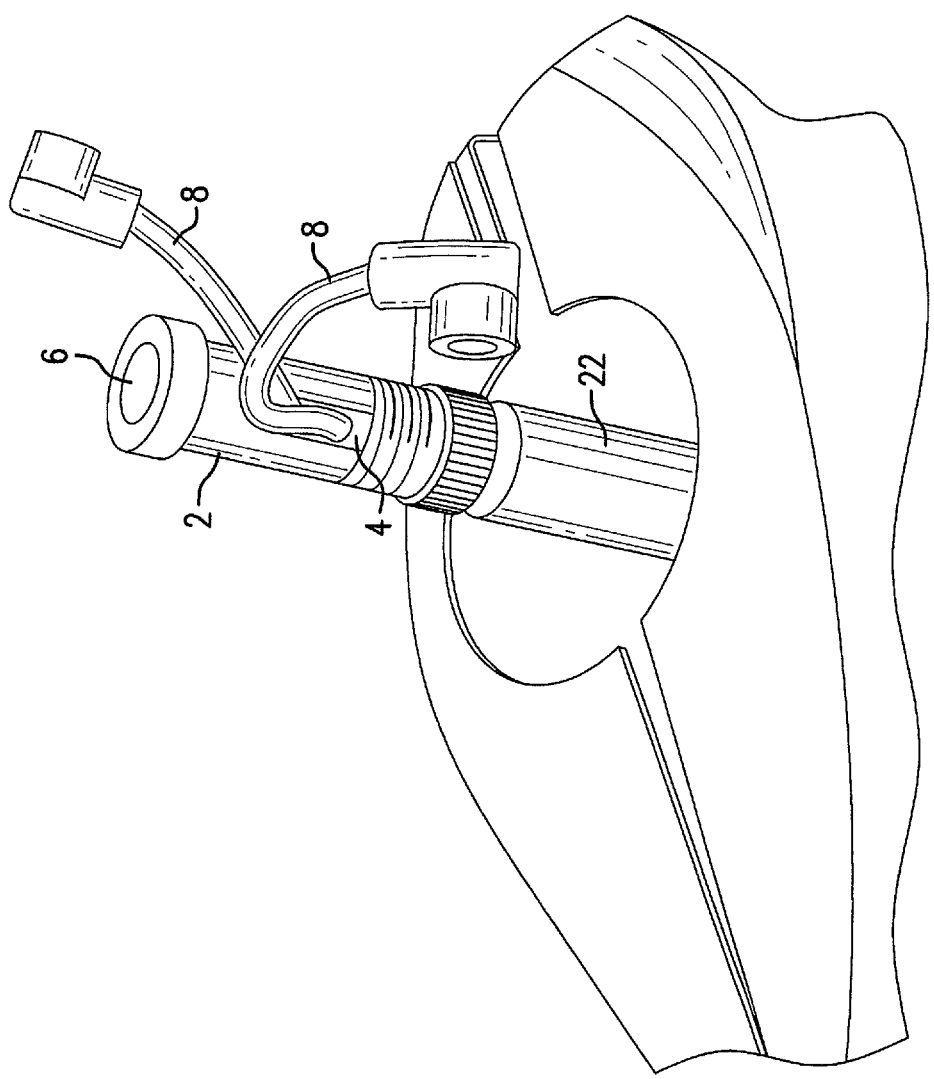
FIG. 2 is a perspective view demonstrating the puller spacer positioned with the horn wires extending through a slot in the body of the puller spacer.

As shown in FIG. 2, the puller spacer is positioned over the steering column 30 after the fastener is removed. The horn wires 8 extend from the steering column, through the bottom of the body 2 of the puller spacer, into the center bore 6 of the puller spacer, and out of the slot 4 in the puller spacer. An additional cylindrical spacer may be positioned under the puller spacer if needed. The wires 8 extend through a center bore of the additional cylindrical spacer 22 and are received into the puller spacer as described.

Figure 3A:
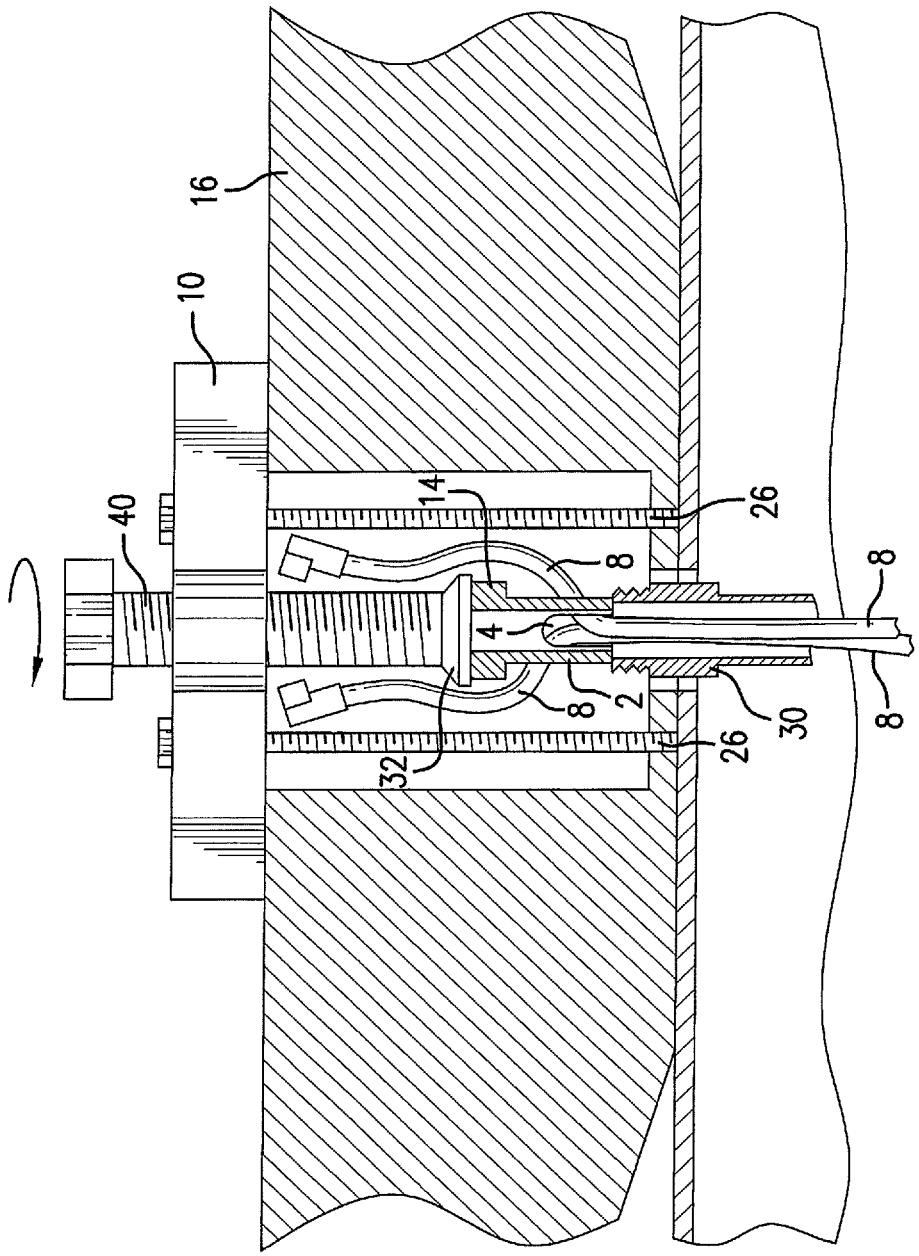
FIG. 3A is a sectioned view showing a steering wheel puller mounted to a steering wheel with the puller spacer in position.

The steering wheel puller 10 is mounted to the steering wheel and shown in FIG. 3A. The steering wheel puller is characterized by two threaded members 26, such as cap screws, that engage threaded holes in the steering wheel 16. The threaded holes 28 are normally preexisting. The steering wheel puller has a center threaded member 40. The center threaded member of the steering wheel puller is positioned over the puller spacer as shown in FIG. 3A. In this Figure, the puller spacer directly engages the steering column 30, at the top of the steering column, with the conductive wires 8 for the horn extending into and out of the slot 4 of the puller spacer.

As the center threaded member 40 is rotated in a clockwise manner (for typical right hand threads) the center member pushes against the steering column 30, with the force transmitted by the puller spacer. The engagement of the two threaded members 26 with the steering wheel 16 causes the steering wheel to pull away from the frictional fit of the steering wheel to the steering column.

Figure 3B:
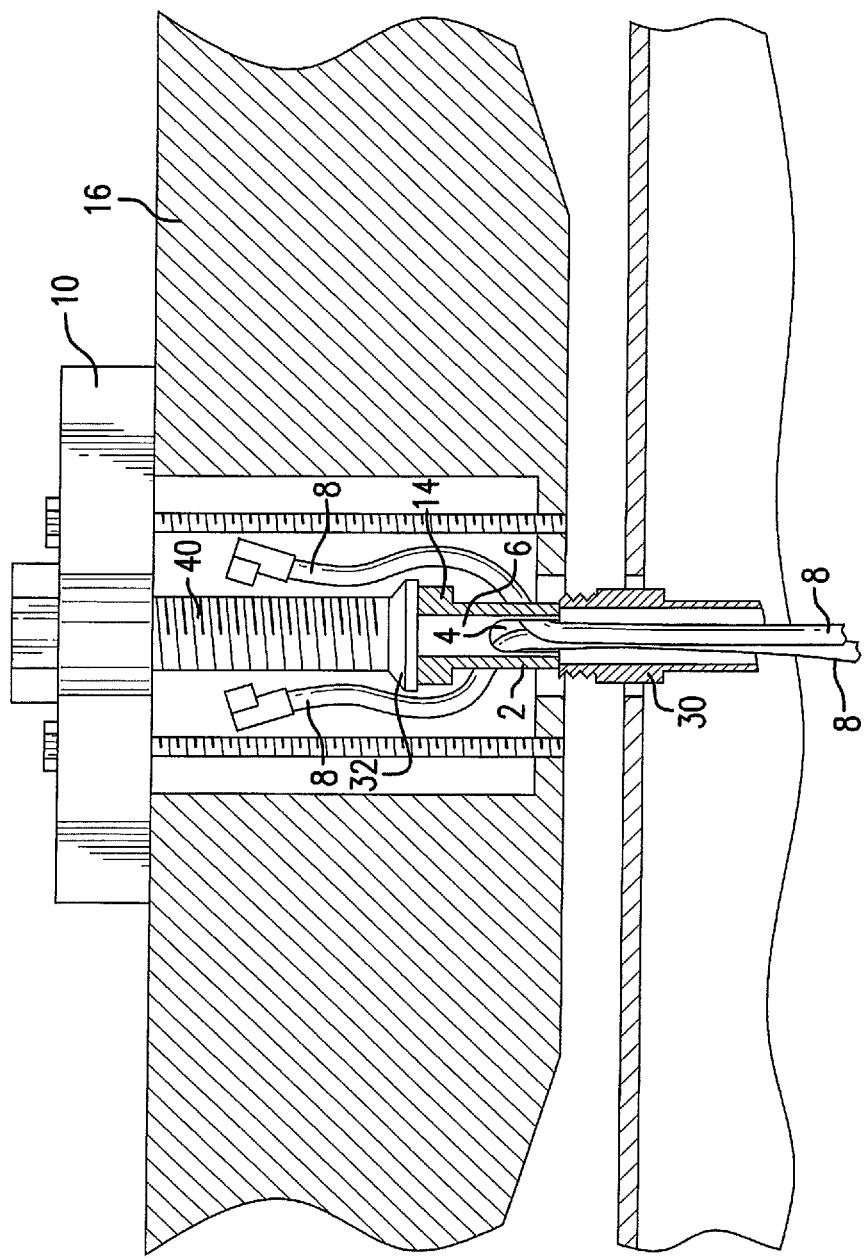
FIG. 3B is a sectioned view showing the progression from FIG. 3A as the center threaded member pushes against the puller spacer and the steering column to pull the steering wheel away from the steering column.

In the embodiment of the steering wheel puller as shown, a swivel 32 mounted to the bottom of the center threaded member 40 engages the shoulders 14 of the puller spacer. The center threaded member rotates relative to the swivel, which is constructed to not rotate as the center threaded member rotates. Therefore, the puller spacer, while transferring a force from the steering wheel puller to the steering column 30, is static as the steering wheel 16 is pulled away from the steering column. Since the puller spacer holding the conductive wires 8 for the horn is static, the conductive wires for the horn are also static. As the steering wheel is pulled away from the steering column (FIG. 3B) the conductive wires 8 for the horn are not subjected to a damaging force from rotation of the steering wheel puller or from having a force applied to the conductive wires by the steering wheel puller.

Figure 4:
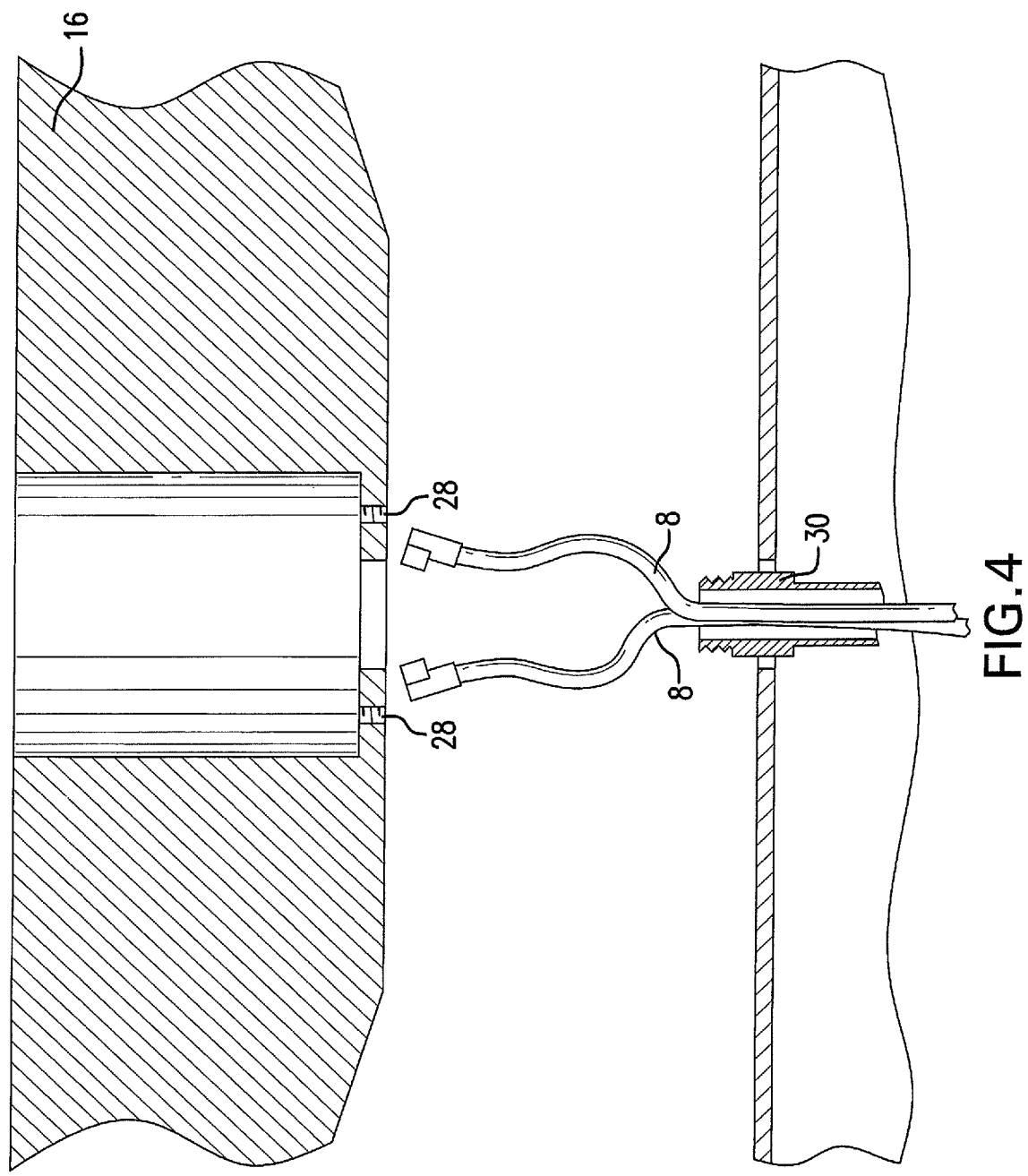
FIG. 4 is a sectioned view showing further progression as the steering wheel is separated from the steering column and the steering wheel puller and puller spacer are removed.

As shown in FIG. 4, the steering wheel 16 is separated from the steering column 30. The steering wheel puller and puller spacer are removed. Repair or replacement of the steering wheel or steering column may be accomplished.

Figure 5:
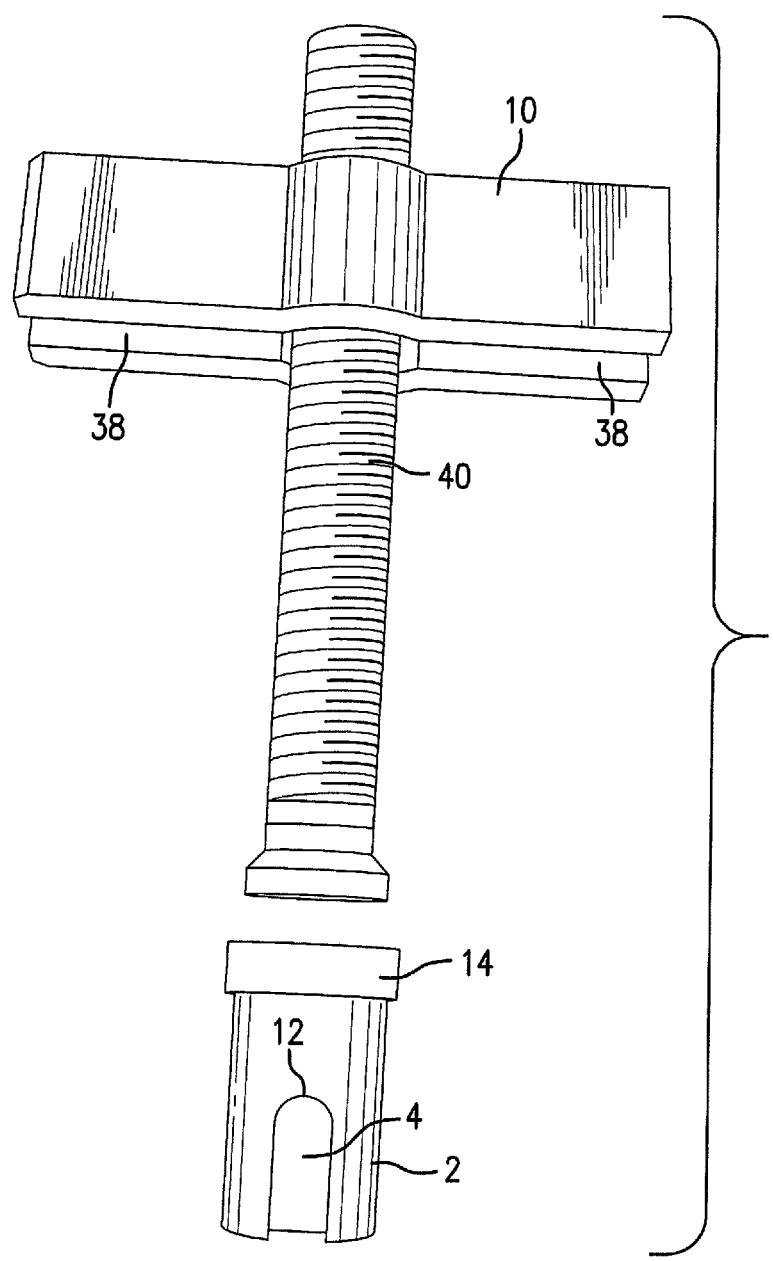
FIG. 5 shows an exemplary steering wheel puller and puller spacer.

An exemplary steering wheel puller is shown in FIG. 5. The swivel 32 is mounted to the bottom of the center threaded member. Slots 38 formed in the steering wheel puller allow threaded members, such as cap screws, of various lengths to be used according to the application, and spaced apart as required.

FIG. 6 is an enlarged view of the puller spacer demonstrating the conductive wires 8 for the horn entering the bottom opening of the center bore 6 of the body 2 and exiting the center bore through the slot 4 formed in the side of the body of the puller spacer.

A preferred diameter of the elongated and lower portion of the body 2 is about 2.25 centimeters. A preferred diameter of the enlarged shoulders 14 is about 2.5 centimeters. A diameter of the center bore 6 of the body may be from about 1.0 centimeters to about 1.2 centimeters. The overall length of the puller spacer may range from about 3.5 centimeters about 4.5 centimeters, with a more preferred length of about 3.8 centimeters. The enlarged shoulders may extend from the lower portion of the body at a height of about 0.6 centimeters to about 0.8 centimeters. The outside diameter of the enlarged shoulders may be knurled for gripping and positioning of the device.

The puller spacer is preferred to be constructed as a unitary member and formed of hardened steel or tool steel. The puller spacer may be chrome plated.

What is claimed:

1. A puller construct for a steering column having wires extending therefrom, the puller construct comprising:
   a puller comprising a support member and a center threaded member, the center threaded member comprising a head and distal enlarged portion;
   a cylindrical body comprising an opening in the bottom thereof that communicates with slot in a side of the cylindrical body, an upper portion of the cylindrical body having a shoulder that is larger than a lower portion of said cylindrical body, wherein said cylindrical body is detachably connected to said puller allowing the puller to push said cylindrical body while retarding rotation of said cylindrical body as said puller rotates.

2. A puller construct as described in claim 1, wherein the support member comprises a slot on a first side of the center threaded member and a slot on a second side of the center threaded member.

3. A puller construct as described in claim 1, wherein the cylindrical body is of sufficient length to engage a steering column and for the puller to push a steering wheel away from the steering column of a vehicle.

4. A puller construct as described in claim 1, wherein the cylindrical body is of sufficient length to engage a steering column and for the puller to push a steering wheel away from the steering column of a vehicle, and is formed of a diameter that is extendable through an opening in the steering wheel that the upper portion of the steering column extends through.

5. A puller construct as described in claim 1, wherein the cylindrical body opens at a top portion.

6. A puller construct as described in claim 1, wherein the cylindrical body is constructed and arranged to receive a first wire and a second wire from a steering column of a vehicle into the cylindrical body and is constructed and arranged for the first wire and the second wire to extend out of the slot in the side of the cylindrical body.

7. A puller construct as described in claim 1, wherein the support member comprises a slot on a first side of the center threaded member and a slot on a second side of the center threaded member, and a first threaded member extends through the slot on the first side of the center threaded member and is constructed and arranged to engage a steering wheel of a vehicle, and a second threaded member extends through the slot on the second side of the center threaded member and is constructed and arranged to engage the steering wheel of the vehicle.

8. A puller construct as described in claim 1, wherein an end of the slot formed in the cylindrical body is arcuate in shape.

9. A puller spacer as described in claim 1, wherein the slot extends along the side of the cylindrical body for not less than fifty (50%) percent of the length of the cylindrical body.

10. A puller spacer as described in claim 1, wherein the cylindrical body comprises an opening in a bottom thereof sufficient to accept two (2) 10 gauge wires therein and the slot communicates with the opening in the bottom of the cylindrical bore and the slot has sufficient width and length to allow the two (2) 10 gauge wires to pass through the slot and out of the cylindrical body.

11. A puller spacer as described in claim 1, wherein the lower portion of the cylindrical body has a diameter of about 2.25 centimeters and the shoulders have a diameter of about 2.5 centimeters.

12. A puller spacer as described in claim 1, wherein the lower portion of the cylindrical body has a diameter of about 2.25 centimeters and the upper portion of the cylindrical body has a diameter of about 2.5 centimeters, and a central opening of the cylindrical body has a diameter from about 1.0 centimeters to about 1.2 centimeters and the overall length of the cylindrical body has a diameter from about 3.5 centimeters to about 4.5 centimeters.

\* \* \* \* \*